(12) United States Patent
Zhuo

(10) Patent No.: US 11,240,991 B2
(45) Date of Patent: Feb. 8, 2022

(54) PET TENT SUPPORT STRUCTURE

(71) Applicant: XIAMEN SHENGXINPET CO., LTD., Fujian (CN)

(72) Inventor: Rumin Zhuo, Xiamen (CN)

(73) Assignee: XIAMEN SHENGXINPET CO., LTD., Fujian (CN)

( * ) Notice: Subject to any disclaimer, the term of this patent is extended or adjusted under 35 U.S.C. 154(b) by 347 days.

(21) Appl. No.: 16/344,800

(22) PCT Filed: Jun. 19, 2017

(86) PCT No.: PCT/CN2017/088977
§ 371 (c)(1),
(2) Date: Apr. 25, 2019

(87) PCT Pub. No.: WO2018/099050
PCT Pub. Date: Jun. 7, 2018

(65) Prior Publication Data
US 2019/0289814 A1  Sep. 26, 2019

(30) Foreign Application Priority Data

Nov. 29, 2016 (CN) .......................... 201621291906.4

(51) Int. Cl.
*A01K 1/03* (2006.01)
*E04H 15/48* (2006.01)
(52) U.S. Cl.
CPC ................ *A01K 1/03* (2013.01); *A01K 1/033* (2013.01); *E04H 15/48* (2013.01)
(58) Field of Classification Search
CPC .......... A01K 1/03; A01K 1/033; E04H 15/48; E04H 15/44
See application file for complete search history.

(56) References Cited

U.S. PATENT DOCUMENTS 6,866,009 B2 * 3/2005 Smith, Jr. ............ A01K 1/0254
119/840
7,044,083 B2 * 5/2006 Farmer ................ A01K 1/0254
119/474
(Continued)

FOREIGN PATENT DOCUMENTS

CN 2891655 Y † 4/2007
CN 201323810 Y † 10/2009
(Continued)

OTHER PUBLICATIONS

China Invalidation Decision, Aug. 14, 2020.†

*Primary Examiner* — David R Dunn
*Assistant Examiner* — Danielle Jackson
(74) *Attorney, Agent, or Firm* — Leong C. Lei

(57) ABSTRACT

A pet tent support structure includes a top-portion support, a bottom-portion support, and two lateral supports capable of being sequentially folded towards the bottom-portion support. The top-portion support includes two horizontal rods capable of being respectively folded towards the lateral supports. The bottom-portion support is a rectangular structure formed by four horizontal rods. The two lateral supports each comprise a horizontal rod and two vertical rods respectively connected to two ends of the horizontal rod. The vertical rods are connected to the bottom-portion support via bottom-portion connection members, and the bottom-portion connection members of the two lateral supports have a difference in height therebetween. The pet tent support structure can be folded easily and quickly, and the size of the structure after folding is small and occupies a small space, thus enabling convenient storage and carrying.

6 Claims, 11 Drawing Sheets

(56) References Cited

U.S. PATENT DOCUMENTS

| | | | |
|---|---|---|---|
| 7,703,416 B2 * | 4/2010 | Farmer | A01K 1/033 |
| | | | 119/474 |
| 7,753,003 B2 * | 7/2010 | Farmer | E04H 15/48 |
| | | | 119/499 |
| 7,789,044 B2 † | 9/2010 | McGrade | |
| 8,047,391 B2 † | 11/2011 | Lu | |
| 8,117,993 B2 * | 2/2012 | Farmer | A01K 1/033 |
| | | | 119/499 |
| 8,746,179 B2 * | 6/2014 | Farmer | A01K 1/0254 |
| | | | 119/499 |
| 8,757,095 B2 * | 6/2014 | Farmer | A01K 1/0035 |
| | | | 119/499 |
| 9,259,094 B1 * | 2/2016 | McCauley | A47C 29/003 |
| 9,485,957 B2 * | 11/2016 | Kellogg | A01K 1/034 |
| 2005/0229866 A1 * | 10/2005 | Simpson | A01K 1/0254 |
| | | | 119/499 |

FOREIGN PATENT DOCUMENTS

| | | | |
|---|---|---|---|
| CN | 202565919 U | † | 12/2012 |
| CN | 203563497 U | † | 4/2014 |

\* cited by examiner  
† cited by third party

PET TENT SUPPORT STRUCTURE

BACKGROUND OF THE INVENTION

1. Field of the Invention

The present invention relates to a tent support, and more particularly to a pet tent support structure.

2. Description of the Prior Art

A pet tent is a kind of pet house that can be used indoors and outdoors. Compared with other types of pet houses, pet tents are easy to carry and can adapt to the harsh outdoor environment, solving the needs of those who like to carry pets for outdoor camping, adventure and travel.

A conventional pet tent is generally composed of a tent support and a fabric covering on the tent support. The tent support consists of a bottom-portion support, a top-portion support and two lateral supports, which cannot be folded. As a result, the assembly, storage and disassembly of the tent support are troublesome. Some tent supports can be folded, but the size of the tent support is large after folding, which will occupy more space. When the tent support is placed at home or taken out for outdoor activities, it will occupy a large space when carried in a car, and it is very inconvenient to carry.

SUMMARY OF THE INVENTION

The primary object of the present invention is to provide a pet tent support structure, which is convenient for use and occupies less space after folding and is convenient for carrying.

In order to achieve the above object, the present invention adopts the following technical solutions:

A pet tent support structure comprises a top-portion support, a bottom-portion support, and two lateral supports capable of being sequentially folded towards the bottom-portion support. The top-portion support comprises two horizontal rods capable of being respectively folded towards the lateral supports. The bottom-portion support is a rectangular structure formed by four horizontal rods. The two lateral supports each comprise a horizontal rod and two vertical rods respectively connected to two ends of the horizontal rod. The vertical rods are connected to the bottom-portion support via bottom-portion connection members. The bottom-portion connection members of the two lateral supports have a difference in height.

First ends of the two horizontal rods of the top-portion support are connected to diagonal ends of the horizontal rods of the two lateral supports through top-portion connection members. Second ends of the two horizontal rods of the top-portion support are provided with slidable members that are slidable along the horizontal rods of the two lateral supports.

The slidable members and the horizontal rods of the two lateral supports are provided with fixing devices to cooperate with each other.

The fixing devices include magnets provided on the slidable members and magnets provided on the horizontal rods of the two lateral supports.

The fixing devices include engaging blocks provided on the slidable members and engaging buckles provided on the horizontal rods of the two lateral supports. The horizontal rods of the two lateral supports are provided with fixing blocks. The engaging buckles are disposed on the fixing blocks. The fixing blocks are provided with slide grooves for the engaging buckles to slide up and down. The engaging blocks are provided with engaging grooves for engagement of the engaging buckles.

The slidable members each have one end connected to a corresponding one of the horizontal rods of the top-portion support and another end formed with an arcuate opening that is engagable with a corresponding one of the horizontal rods of the lateral supports.

The bottom-portion connection members each include a two-way connector connected with every adjacent two of the horizontal rods of the bottom-portion support, an adapter connected with the two-way connector, and a hinge. A lower end of the hinge is hinged to the adapter, and an upper end of the hinge is connected to a corresponding one of the vertical rods of the two lateral supports.

The top-portion connection members each include a fixing member connected to a corresponding one of the lateral supports, an adapter connected with the fixing member, and a hinge. One end of the hinge is hinged to the adapter, and another end of the hinge is connected to a corresponding one of the horizontal rods of the top-portion support.

The adapters of the bottom-portion connection members of the two lateral supports have a difference in height.

A through hole is defined in the two-way connector of each of the bottom-portion connection members. The adapter is provided with a screw hole passing through the adapter. The screw hole of the adapter corresponds to the through hole of the two-way connector and is connected with a bolt and a nut.

The two horizontal rods of the top-portion support are folded to lean against the horizontal rods of the two lateral supports respectively, and then the two lateral supports are sequentially folded to rest on the bottom-portion support. Therefore, the pet tent support structure can be folded easily and quickly, and the size of the structure after folding is small and occupies a small space, thus enabling convenient storage and carrying.

Besides, the slidable member of the top-portion support and the horizontal rods of the lateral supports are provided with fixing devices to cooperate with each other, thereby making the connection of the top-portion support more stable and ensuring the stability of the pet tent support structure in an unfolded state.

DETAILED DESCRIPTION OF THE PREFERRED EMBODIMENTS

For a detailed description of the technical contents, structural features, objects and effects of the present invention, embodiments will be described in detail below with reference to the accompanying drawings.

As shown in FIG. 1 through FIG. 11, the present invention discloses a pet tent support structure. A fabric covering is provided on the tent support to form a tent that can be used indoors and outdoors for pets.

Figure 1:
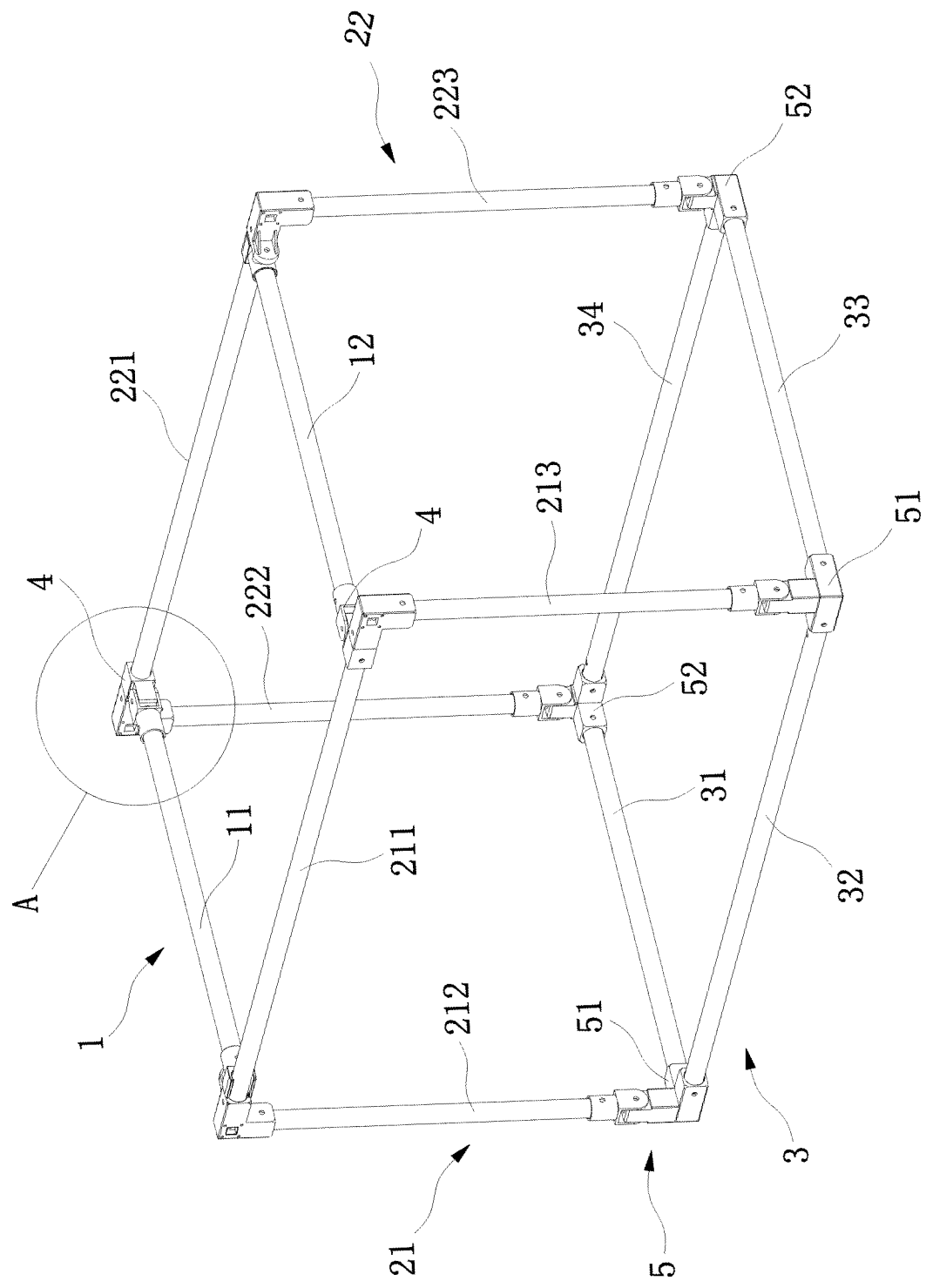
FIG. 1 is a schematic view of the present invention in an unfolded state.

Referring to FIG. 1, the pet tent support structure comprises a bottom-portion support 3, a top-portion support 1, and two lateral supports 21, 22. The top-portion support 1 comprises two horizontal rods 11, 12 capable of being respectively folded towards the lateral supports 21, 22. The bottom-portion support 3 is a rectangular structure formed by four horizontal rods. The lower ends of the two lateral supports 21, 22 are connected to the bottom-portion support 3, respectively. The two lateral supports 21, 22 can be sequentially folded to rest on the bottom-portion support 3.

The bottom-portion support 3 is a rectangular structure formed by four horizontal rods. The four horizontal rods are a first bottom-portion horizontal rod 31, a second bottom-portion horizontal rod 32, a third bottom-portion horizontal rod 33 and a fourth bottom-portion horizontal rod 34, respectively. The first bottom-portion horizontal rod 31 and the third bottom-portion horizontal rod 33 are opposite to each other. The second bottom-portion horizontal rod 32 and the fourth bottom-portion horizontal rod 34 are opposite to each other.

The two lateral supports 21, 22 are a first lateral support 21 and a second lateral support 22, respectively. The two lateral supports 21, 22 each comprise a horizontal rod and two vertical rods having upper ends respectively connected to two ends of the horizontal rod. Lower ends of the vertical rods are connected to the bottom-portion support 3. The horizontal rods of the two lateral supports 21, 22 are lateral horizontal rods 211, 221. The vertical rods of the two lateral supports 21, 22 are first vertical rods 212, 222 and second vertical rods 213, 223. A two-way connector may be connected between the first vertical rods 212, 222/the second vertical rods 213, 223 and the lateral horizontal rods 211, 221.

Figure 6:
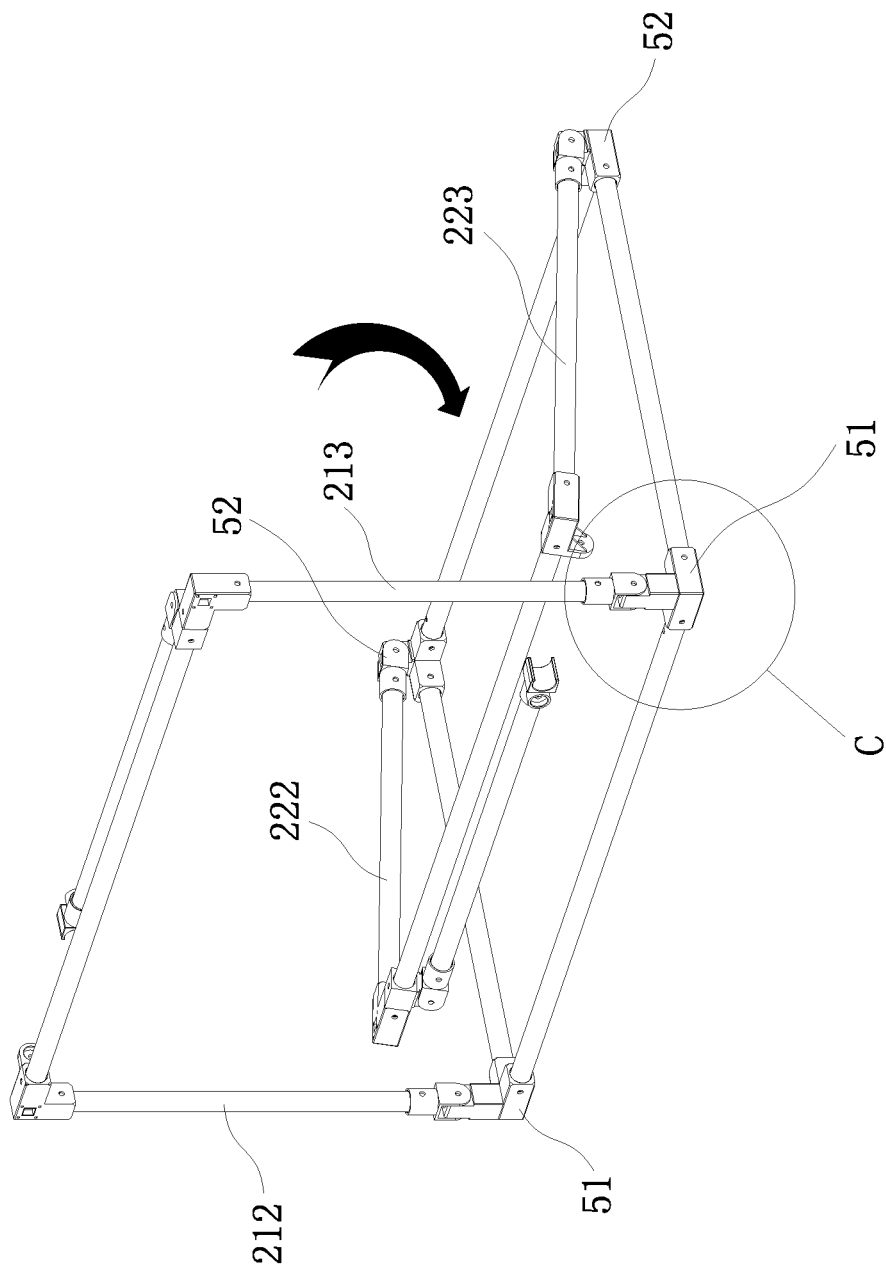
FIG. 6 is a first schematic view of the present invention, showing that the lateral support is folded.
Figure 7:
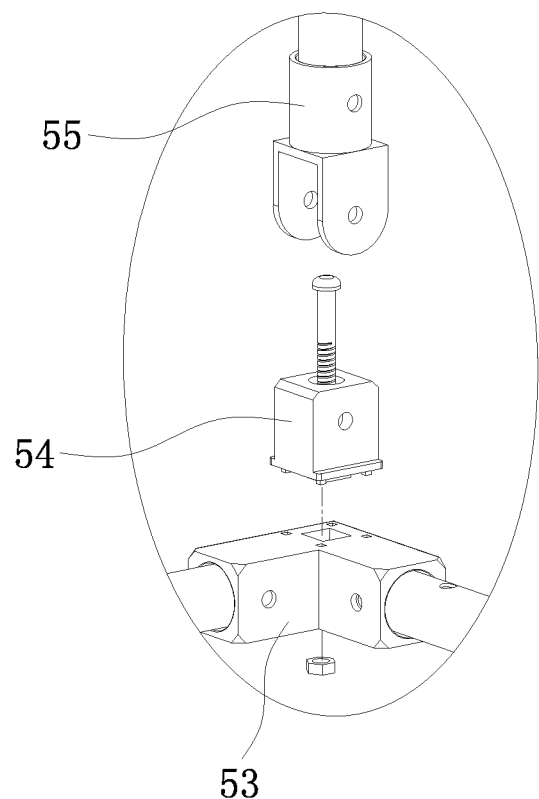
FIG. 7 is an exploded view of the structure of circle C of FIG. 6.
Figure 8:
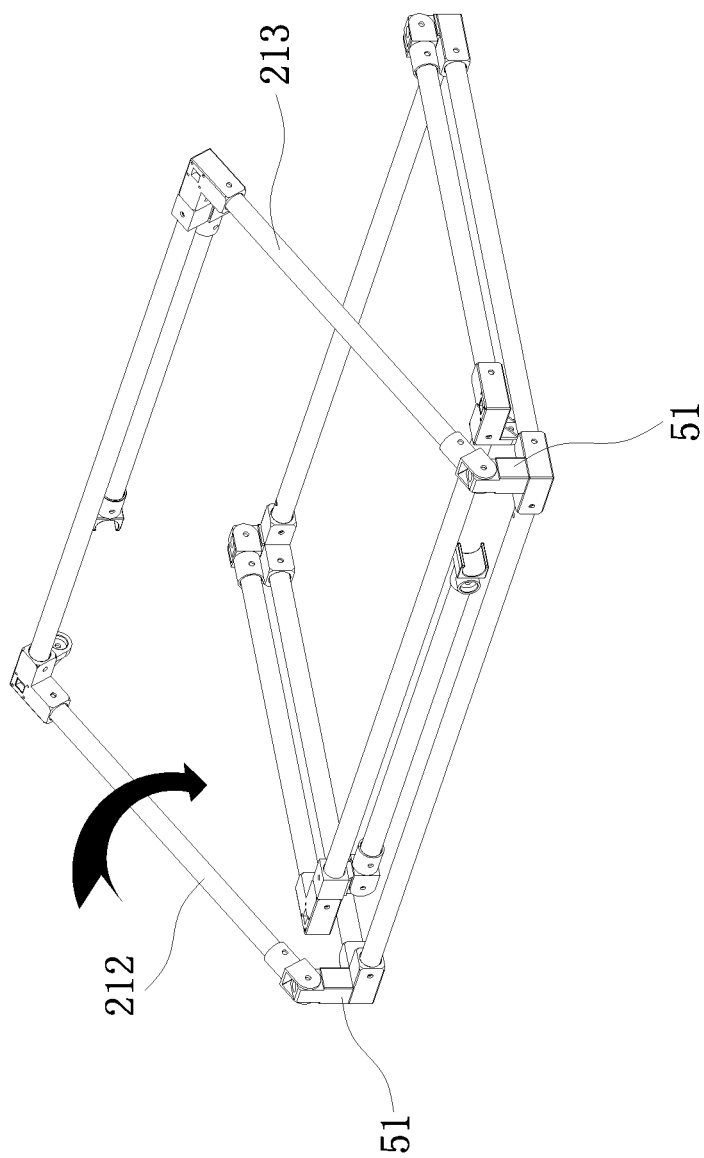
FIG. 8 is a second schematic view of the present invention, showing that the lateral support is folded.

Referring to FIG. 6 to FIG. 8, the lower end of the first vertical rod 212 of the first lateral support 21 is connected to the first bottom-bottom horizontal rod 31 and the second bottom-portion horizontal rod 32 via a bottom-portion connection member 5. The lower end of the second vertical rod 211 of the first lateral support 21 is connected to the second bottom-bottom horizontal rod 32 and the third bottom-portion horizontal rod 33 via another bottom-portion connection member 5. The two bottom-portion connection members 5 are identical in structure and defined as first bottom-portion connection members 51. The first vertical rod 222 of the second lateral support 22 is connected to the first bottom-bottom horizontal rod 31 and the fourth bottom-portion horizontal rod 34 via a bottom-portion connection member 5. The second vertical rod 223 of the second lateral support 22 is connected to the third bottom-bottom horizontal rod 33 and the fourth bottom-portion horizontal rod 34 via another bottom-portion connection member 5. The two bottom-portion connection members 5 are identical in structure and defined as second bottom-portion connection members 52.

Referring to FIG. 7, the first bottom-portion connection member 51 allow the first lateral support 21 to be folded towards the bottom-portion support 3. The first bottom-portion connection member 51 includes a two-way connector 53, an adapter 54 and a hinge 55. When the first bottom-portion connection member 5 connects the first vertical rod 212 of the first lateral support 21 with the first bottom-bottom horizontal rod 31 and the second bottom-bottom horizontal rod 32, the two-way connector 53 connects the first bottom-bottom horizontal rod 31 and the second bottom-bottom horizontal rod 32 by screws. A through hole is defined in the two-way connector 53. The adapter 54 is provided with a screw hole passing through the adapter. The screw hole corresponds to the through hole of the two-way connector. A bolt is inserted through the screw hole and the through hole in sequence and then locked at the bottom of the two-way connector 53 with a nut, so that the adapter 54 and the two-way connector 53 are connected together. The adapter 54 may be integrally formed with the two-way connector 53. The lower end of the hinge 55 is hinged to the adapter 54, and the upper end of the hinge 55 is fitted on the first vertical rod 212 of the first lateral support 21 and locked by a screw. The first vertical pole 212 can be folded along the length of the first bottom-bottom horizontal rod 31 under the action of the hinge 55.

The second bottom-portion connection member 52 allows the second lateral support 22 to be folded towards the bottom-portion support 3. The second bottom-portion connection member 52 is similar to the first bottom-portion connection member 51 except that there is a height difference between the adapter 54 of the second bottom-portion connection member 52 and the adapter 54 of the first bottom-portion connection member 51, such that the first lateral support 21 and the second lateral support 22 can be folded towards the bottom-portion support 3 in sequence. In this embodiment, the height of the adapter 54 of the second bottom-portion connection member 52 is less than the height of the adapter 54 of the first bottom-portion connection member 51. That is to say, in this embodiment, the second lateral support 22 is firstly folded to rest on the bottom-portion support 3, and the first lateral support 21 is folded towards the bottom-portion support 3 to rest on the second lateral support 22.

Figure 3:
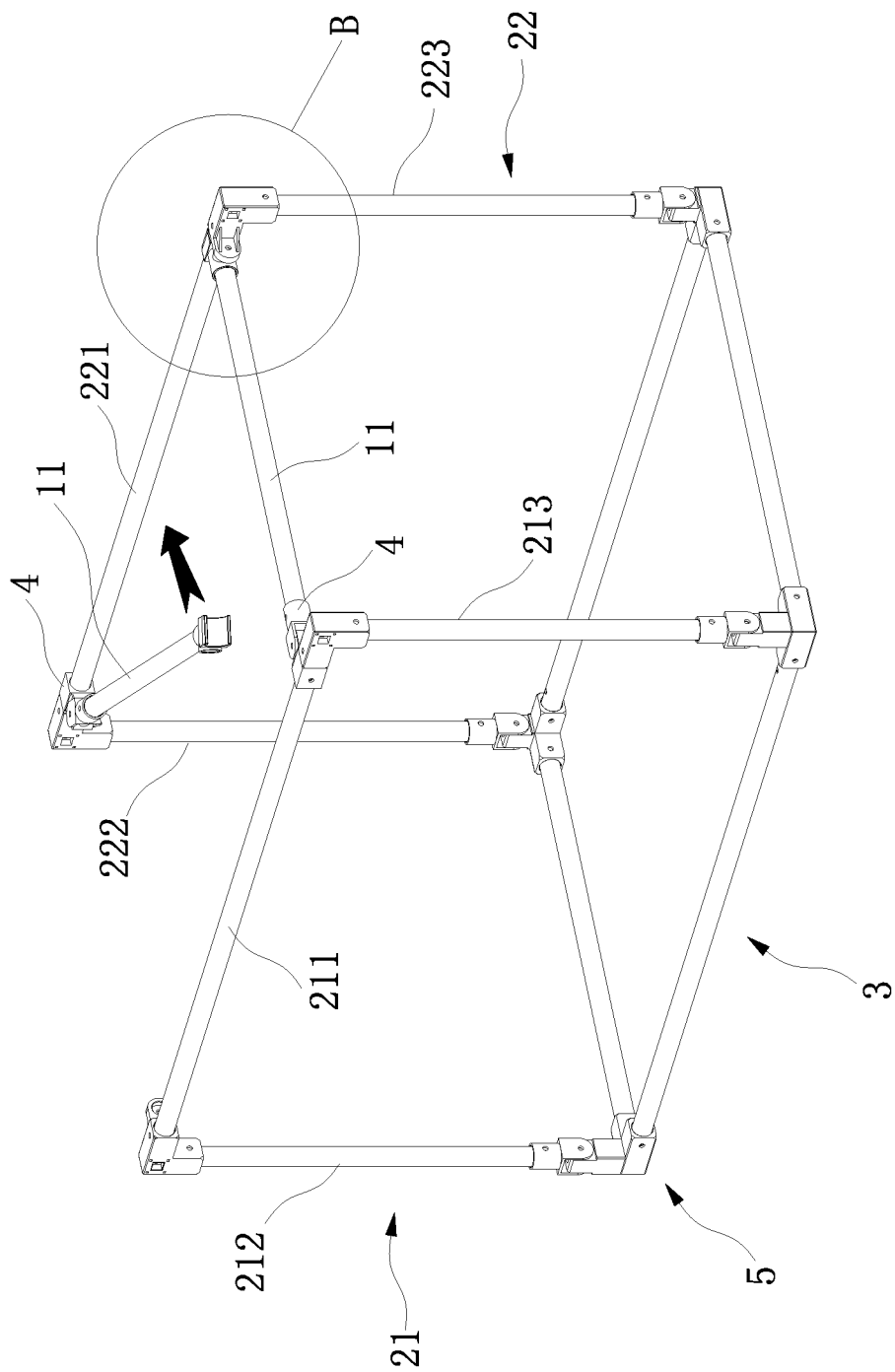
FIG. 3 is a first schematic view of the present invention, showing that the top-portion support is folded.
Figure 4:
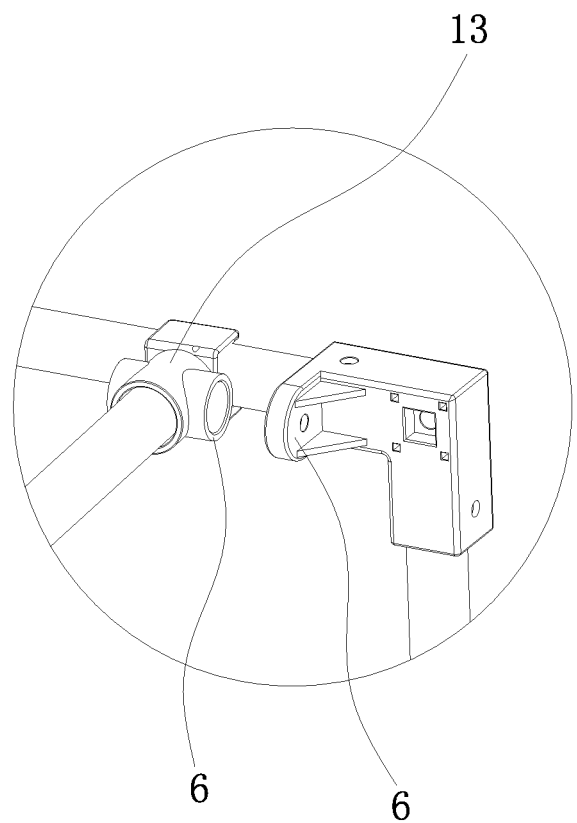
FIG. 4 is a schematic view of the structure of circle B of FIG. 3.
Figure 5:
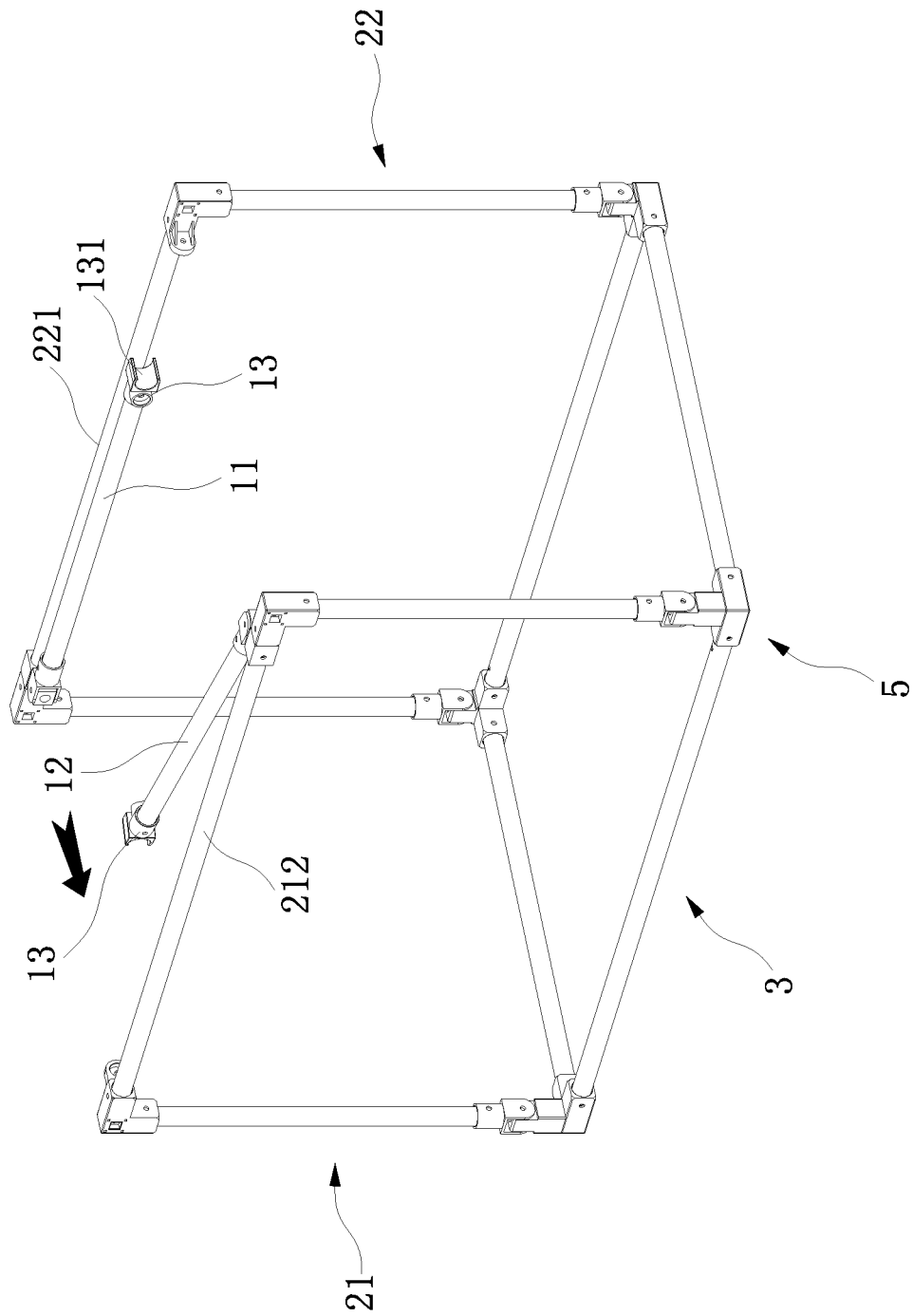
FIG. 5 is a second schematic view of the present invention, showing that the top-portion support is folded.

Referring to FIG. 3 to FIG. 5, the top-portion support 1 includes two horizontal rods that can be folded towards the sides of the first lateral support 21 and the second lateral support 22, respectively. The ends of the two horizontal rods are connected to diagonal ends of the lateral horizontal rods 211, 221 of the first lateral support 21 and the second lateral support 22. In this embodiment, the two horizontal rods are defined as a first top-portion horizontal rod 11 and a second top-portion horizontal rod 12, respectively. One end of the first top-portion horizontal rod 11 is connected to one end of the lateral horizontal rod 221 of the second lateral support 22 close to the first vertical rod 222 through a top-portion connection member 4. The other end of the first top-portion horizontal rod 11 is provided with a slidable member 13 that is slidable along the lateral horizontal rod 211 of the first lateral support 21. One end of the second top-portion horizontal rod 12 is connected to one end of the lateral horizontal rod 211 of the first lateral support 21 close to the second vertical rod 213 through a top-portion connection member 4. The other end of the second top-portion horizontal rod 12 is provided with a slidable member 13 that is slidable along the lateral horizontal rod 221 of the second lateral support 22.

Figure 2:
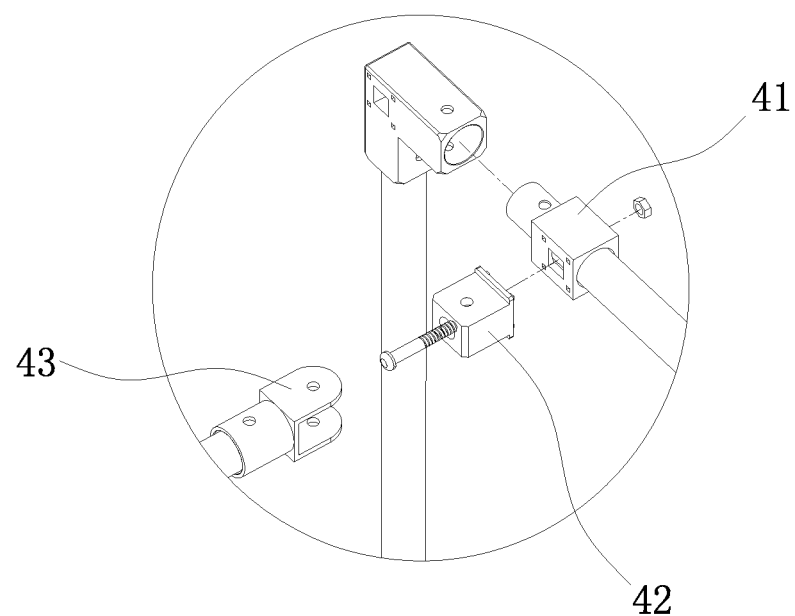
FIG. 2 is an exploded view of the structure of circle A of FIG. 1.

Referring to FIG. 2, the top-portion connection member 4 includes a fixing member 41, an adapter 42, and a hinge 43. When the top-portion connection member 4 connects the first top-portion horizontal rod 11 and the second lateral support 22, the fixing member 41 is fitted to one end of the lateral horizontal rod 221 of the second lateral support 22 close to the first vertical rod 222. The adapter 42 is connected to the fixing member 41 by a bolt and a nut. One end of the hinge 43 is hinged to the adapter 42, and the other end is fitted on the first top-portion horizontal rod 11, so that one end of the first top-portion horizontal rod 11 is connected to the lateral horizontal rod 221 of the second lateral support 22, and the first top-portion horizontal rod 11 can be folded to lean against one side of the lateral horizontal rod 221.

One end of the slidable member 13 is fitted on the first top-portion horizontal rod 11, and the other end is an arcuate opening 131 that can be engaged with the lateral horizontal rod 211 of the first lateral support 21. The arcuate opening 131 cooperates with the lateral horizontal rod 211 of the first lateral support 21 so that the other end of the first top-portion horizontal rod 11 can slide along the lateral horizontal rod 211 to be secured at one end of the lateral horizontal rod 211 close to the first vertical rod 212.

The connection of the second top-portion horizontal rod 12 and the first lateral support 21 is the same as the connection of the first top-portion horizontal rod 11 and the second lateral support 22, and will not be described again.

When the pet tent support structure is in use, the top-portion support 1, the bottom-portion support 3 and the two lateral supports 21, 22 cooperate with each other to form a rectangular frame structure, and the rectangular frame structure is covered with a fabric covering, used as a pet tent.

Figure 9:
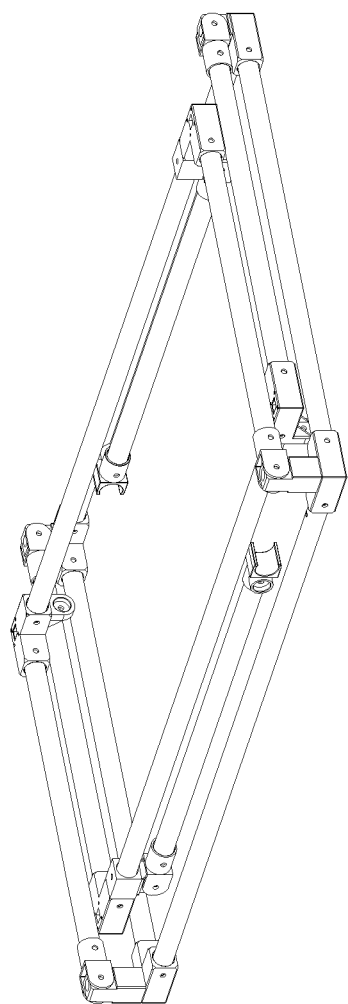
FIG. 9 is a schematic view of the present invention in a folded state.

Referring to FIG. 9, the tent support can be folded quickly when it is not needed. First, the two horizontal rods of the top-portion support 1 are folded to lean against the two lateral supports 21, 22, respectively. Then, the two lateral supports 21, 22 with the two horizontal rods of the top-portion support 1 are sequentially folded to rest on the bottom-portion support 3. In this way, the pet tent support will be folded into a rectangular frame, which occupies less space and is convenient to carry.

In order to make the connection of the top-portion support 1 more stable and further ensure the stability of the above-mentioned tent support structure in an unfolded state, the second lateral support 22 and the slidable member 13 of the second top-portion horizontal rod 12 are provided with fixing devices to cooperate with each other. The first lateral support 21 and the slidable member 13 of the first top-portion horizontal rod 11 are provided with fixing devices to cooperate with each other.

Referring to FIG. 4, the fixing devices are a magnet 6 provided on the slidable member 13 and magnets 6 provided on the lateral horizontal rods 211, 221 of the first lateral support 21 and the second lateral support 22. When one end of the first top-portion horizontal rod 11 slides to one end of the lateral horizontal rod 211 of the first lateral support 21 close to the first vertical rod 212, the magnet 6 on the slidable member 13 of the first top-portion horizontal rod 11 and the magnet 6 on the first lateral support 21 are attracted each other, so that one end having the slidable member 13 of the first top-portion horizontal rod 11 is firmly secured at one end of the lateral horizontal rod 211 of the first lateral support 21 close to the first vertical rod 212. Similarly, one end having the slidable member 13 of the second top-portion horizontal rod 12 is firmly secured at one end of the lateral horizontal rod 221 of the second lateral support 22 close to the second vertical rod 223.

Figure 10:
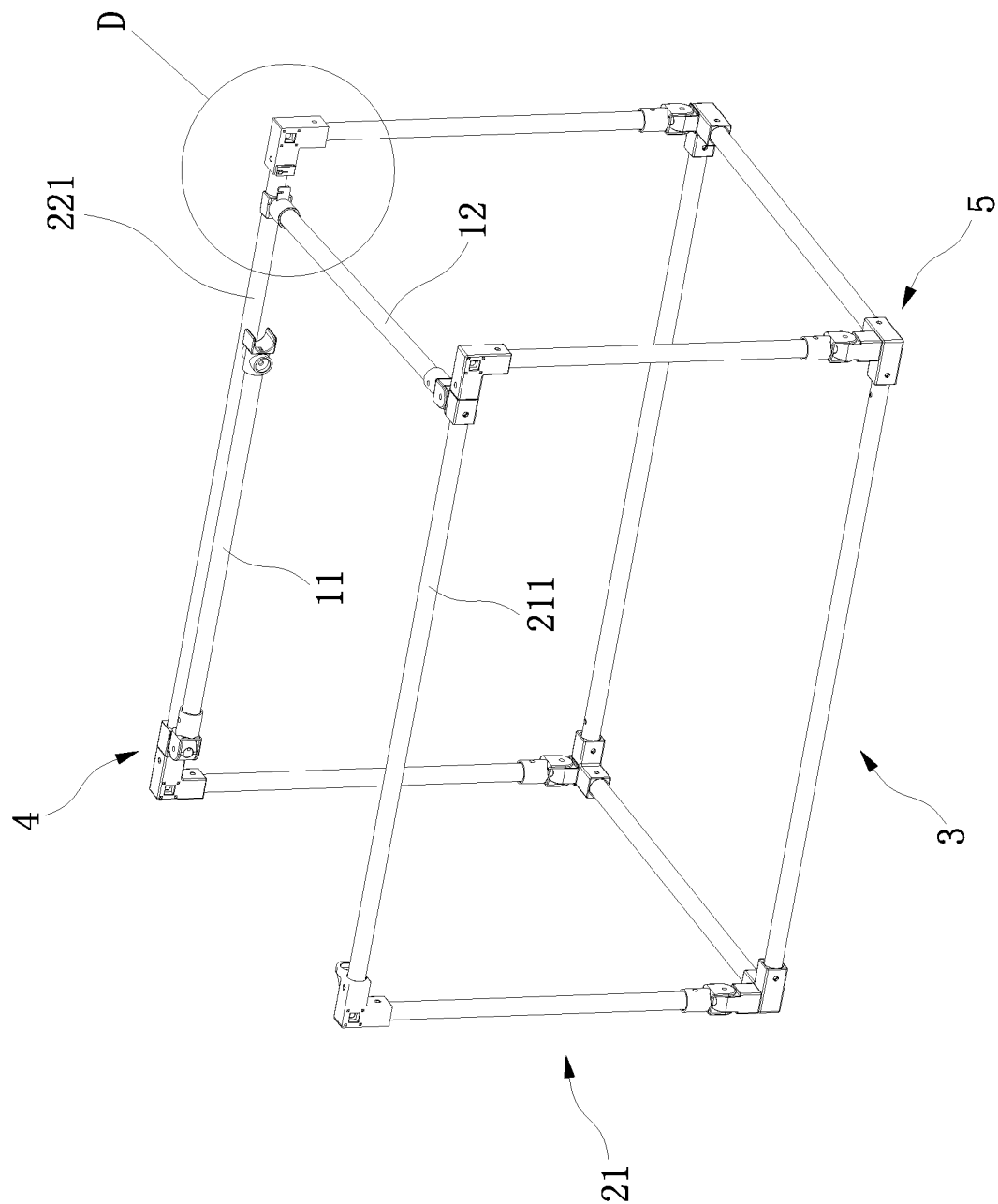
FIG. 10 is a schematic view of another embodiment of the present invention.
Figure 11:
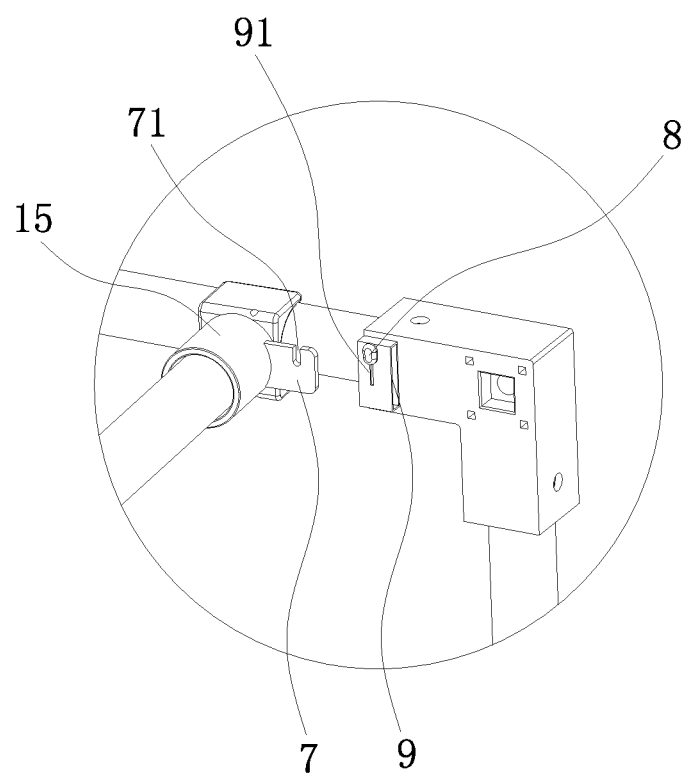
FIG. 11 is a schematic view of the structure of circle D of FIG. 10.

Referring to FIG. 10 and FIG. 11, the fixing devices may be an engaging block 7 provided on the slidable member 13 and an engaging buckle 8 provided on each of the lateral horizontal rods 211, 221. A positioning member 9 is disposed on each of the lateral horizontal rods 211, 221. The engaging buckle 8 is disposed on the positioning member 9. The positioning member 9 is provided with a slide groove 91 for the engaging buckle 8 to slide up and down. The engaging block 7 is provided with an engaging groove 71 in cooperation with the engaging buckle 8. When one end of the first top-portion horizontal rod 11 slides to one end of the lateral horizontal rod 211 of the first lateral support 21 close to the first vertical rod 212, the engaging buckle 8 on the lateral horizontal rod 211 slides down along the slide groove 91 to be engaged in the engaging groove 71 of the engaging block 7, so that the first top-portion horizontal rod 11 is firmly secured between the first lateral support 21 and the second lateral support 22. Similarly, the second top-portion horizontal rod 12 is also firmly secured between the first lateral support 21 and the second lateral support 22.

In the present invention, the two horizontal rods of the top-portion support 1 may be detachably connected to the two lateral supports 21, 22, respectively. The lateral horizontal rods 211, 221 of the lateral supports 21, 22 are provided with fixing grooves. When the tent support is folded, the two horizontal rods of the top-portion support 1 are detached to lean against the lateral horizontal rods 211, 221 through the fixing grooves.

The bottom-portion support 3 and the top-portion support 1 of the pet tent support structure of the present invention are not limited to function as a bottom or a top during use.

The key point of the present invention is that the two horizontal rods of the top-portion support 1 are folded to lean against the horizontal rods of the two lateral supports 21, 22 respectively, and then the two lateral supports 21, 22 are sequentially folded to rest on the bottom-portion support 3. Therefore, the pet tent support structure can be folded easily and quickly, and the size of the structure after folding is small and occupies a small space, thus enabling convenient storage and carrying.

Besides, the slidable member 13 of the top-portion support 1 and the horizontal rods of the lateral supports 21, 22 are provided with fixing devices to cooperate with each other, thereby making the connection of the top-portion support more stable and ensuring the stability of the pet tent support structure in an unfolded state.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. A pet tent support structure, comprising: a top-portion support, a bottom-portion support, and two lateral supports capable of being sequentially folded towards the bottom-portion support; the top-portion support comprising two horizontal rods capable of being respectively folded towards the lateral supports, the bottom-portion support being a rectangular structure formed by four horizontal rods, the two lateral supports each comprising a horizontal rod and two vertical rods respectively connected to two ends of the horizontal rod, the vertical rods being connected to the bottom-portion support via bottom-portion connection members, the bottom-portion connection members of the two lateral supports having a difference in height; wherein first ends of the two horizontal rods of the top-portion support are connected to diagonal ends of the horizontal rods of the two lateral supports through top-portion connection members, and each of second ends of the two horizontal rods of the top-portion support is provided with a slidable member that is slidable along the horizontal rod of a respective one of the two lateral supports; wherein the slidable members and the horizontal rods of the two lateral supports are provided with fixing devices to cooperate with each other; wherein the fixing devices include engaging blocks provided on the slidable members and engaging buckles provided on the horizontal rods of the two lateral supports, the horizontal rods of the two lateral supports are provided with fixing blocks, the engaging buckles are disposed on the fixing blocks, the fixing blocks are provided with slide grooves for the engaging buckles to slide up and down, and the engaging blocks are provided with engaging grooves for engagement of the engaging buckles.

2. The pet tent support structure as claimed in claim 1, wherein the slidable members each have one end connected to a corresponding one of the horizontal rods of the top-portion support and another end formed with an arcuate opening that is engagable with a corresponding one of the horizontal rods of the two lateral supports.

3. The pet tent support structure as claimed in any one of claims 1 and 2, wherein the bottom-portion connection members each include a two-way connector connected with every adjacent two of the horizontal rods of the bottom-portion support, an adapter connected with the two-way connector, and a hinge; a lower end of the hinge is hinged to the adapter, and an upper end of the hinge is connected to a corresponding one of the vertical rods of the two lateral supports.

4. The pet tent support structure as claimed in claim 3, wherein the adapters of the bottom-portion connection members of the two lateral supports have a difference in height.

5. The pet tent support structure as claimed in claim 3, wherein a through hole is defined in the two-way connector of each of the bottom-portion connection members, the adapter is provided with a screw hole passing through the adapter, the screw hole of the adapter corresponds to the through hole of the two-way connector and is connected with a bolt and a nut.

6. The pet tent support structure as claimed in any one of claims 1 and 2, wherein the top-portion connection members each include a fixing member connected to a corresponding one of the two lateral supports, an adapter connected with the fixing member, and a hinge; one end of the hinge is hinged to the adapter, and another end of the hinge is connected to a corresponding one of the horizontal rods of the top-portion support.

\* \* \* \* \*